United States Patent [19]

Gudat

[11] Patent Number: 5,600,436
[45] Date of Patent: Feb. 4, 1997

[54] APPARATUS AND SYSTEM FOR DETERMINING TERRESTRIAL POSITION

[75] Inventor: Adam J. Gudat, Edelstein, Ill.

[73] Assignee: Caterpillar Inc., Peoria, Ill.

[21] Appl. No.: 177,364

[22] Filed: Jan. 5, 1994

[51] Int. Cl.$^6$ ............................ G01B 11/26; G01B 11/14; G01B 11/24; E02F 3/76
[52] U.S. Cl. .................... 356/141.3; 172/4.5; 356/4.08; 356/375; 356/376
[58] Field of Search ........................... 172/4.5; 356/376, 356/375, 4.08, 141.3

[56] References Cited

U.S. PATENT DOCUMENTS

| | | | |
|---|---|---|---|
| 4,818,107 | 4/1989 | Ono et al. ......................... | 356/375 |
| 4,820,041 | 4/1989 | Davidson et al. .................. | 356/1 |
| 5,100,229 | 3/1992 | Lundberg et al. .................. | 356/1 |
| 5,110,202 | 5/1992 | Dornbusch et al. ................ | 356/1 |
| 5,375,663 | 12/1994 | Teach .............................. | 172/4.5 |

*Primary Examiner*—Stephen C. Buczinski
*Attorney, Agent, or Firm*—James R. Yee

[57] ABSTRACT

The present invention provides a spatial positioning and measurement system and a reference station for determining the instantaneous position of a dynamic reference point. The reference station emits a primary laser beam, determines the terrestrial position of a local reference point located on the reference station using a satellite based global positioning system and transmits the terrestrial position. The system detects the primary laser beam and the terrestrial position of the local reference point and responsively determining the terrestrial position of the dynamic reference point.

28 Claims, 15 Drawing Sheets

1300

APPARATUS AND SYSTEM FOR DETERMINING TERRESTRIAL POSITION

TECHNICAL FIELD

This invention relates generally to an apparatus and system for determining terrestrial position and more particularly to an apparatus and system for determining terrestrial position utilizing a laser.

BACKGROUND ART

Today's construction site is designed by an architect. The architect's designs are copied to blueprints and transmitted to the contractor. The contractor will stake the area, i.e., survey the undeveloped area and place stakes at predetermined positions. The contractor, by comparing the architect's plans and the results of the survey, will determine the amount of dirt that needs to be removed or placed at each marker to meet the design plans.

After this process, earthmoving machines, e.g., bulldozers, scrapers, or excavators, are used to remove or fill the areas around the stakes. An unprocessed island is left remaining around the stake. After all the areas have been processed, the site is surveyed once again to confirm that the processed site meets the design specifications.

The above process requires large amounts of manual labor. The site has to be surveyed, staked, molded and surveyed once again. Furthermore, only a highly trained operator can efficiently operate the machine to obtain the desired degree of accuracy.

Laser systems have been used in order to provide a reference to the operator in performing this process. Typically, the laser system emits a beam of light which is swept over the site in a plane. The machine must be equipped with a suitable receiver. The system is able to give the operator an indication of the height of the machine and/or work implement.

However, there are certain limitations in present laser systems. First, present day systems rely on a number of reference stations which produce laser beams. Each of the reference stations must be place at a pre-surveyed position. The reference station cannot be moved without surveying in a new position. This limits the systems' usefulness because the survey process is time consuming. In addition, the reference stations must be placed at a location which is not subject to change. Otherwise a new location will have to be surveyed. Also, the present systems are limited in that without surveying new locations for the reference stations, the systems range is limited to the range of the laser and detectors.

Furthermore, the site plan must be defined with a fixed reference system. In order to determine position relative to the fixed reference system, the location of the reference station must be known within the fixed reference system. In known systems, the location of each reference station must be manually surveyed. In addition, the reference station cannot be moved without surveying the new location.

Other systems have used positioning systems directly on the various machines. For example, satellite systems enable a user with a specialized receiver to receive transmitted signals and using triangulation methods enable a user to determine position. However at a work site, this would require equipping each work machine that was processing the site with an expensive receiver.

The present invention is directed to overcoming one or more of the problems, as set forth above.

DISCLOSURE OF THE INVENTION

In one aspect of the present invention a reference station is provided. The reference station emits a primary laser beam, determines the terrestrial position of a local reference point located on the reference station and transmits the terrestrial position.

In another aspect of the present invention a spatial positioning and measurement system for determining the instantaneous position of a dynamic reference point is provided. The system includes at least one reference station which emits a primary laser beam, determines the terrestrial position of a local reference point located on the reference station and transmits the terrestrial position. The system detects the primary laser beam and the terrestrial position of the local reference point and responsively determines the terrestrial position of the dynamic reference point.

BEST MODE FOR CARRYING OUT THE INVENTION

With reference to FIGS. 1–15, the present invention is adapted to determine the terrestrial position of a dynamic reference point (DP). Terrestrial position refers to position relative to the Earth, i.e. a coordinate system having an origin at the center of the Earth. As used herein, terrestrial may also refer to a local site coordinate system. Thus, the local site reference coordinate system is fixed and transformations between the Earth coordinate system (originating at the center of the Earth) and the local site reference coordinate system is easily accomplished.

The present invention encompasses a reference station 100 having an axis 110 which uses a global position satellite (GPS) system to determine its position in the terrestrial or local site reference coordinate system and a generates a laser beam.

Figure 2:
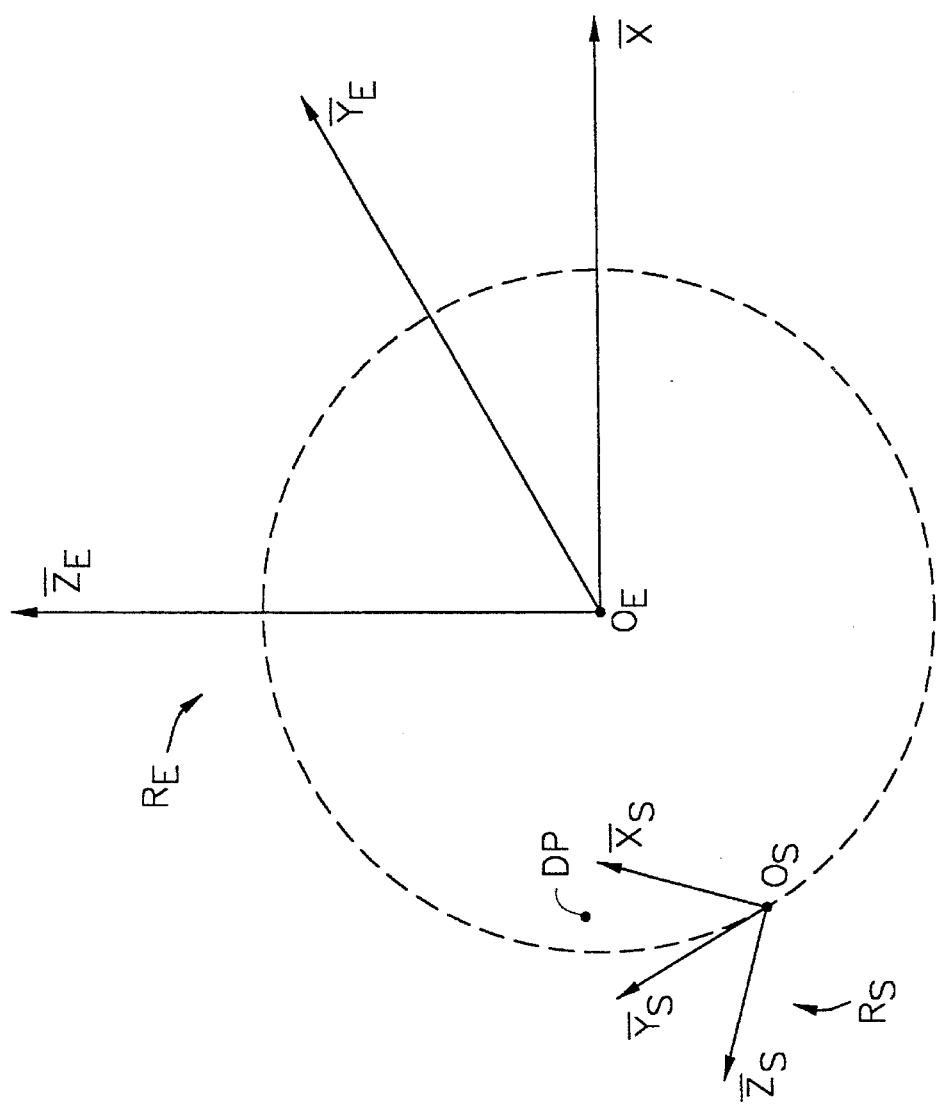
FIG. 2 is a diagrammatical representation of an fixed Earth reference system and a reference station reference system.

With particular reference to FIG. 2, in one embodiment, a construction site is defined with reference to the fixed reference system having an origin at the center of the Earth ($R_E$). In this embodiment, the Earth reference system ($R_E$) is known as the terrestrial reference system $R_T$. The terrestrial reference system (and all other reference systems discussed herein) is preferably defined in Cartesian coordinates, but may be defined in other coordinate systems. e.g. cylindrical coordinates.

Figure 3:
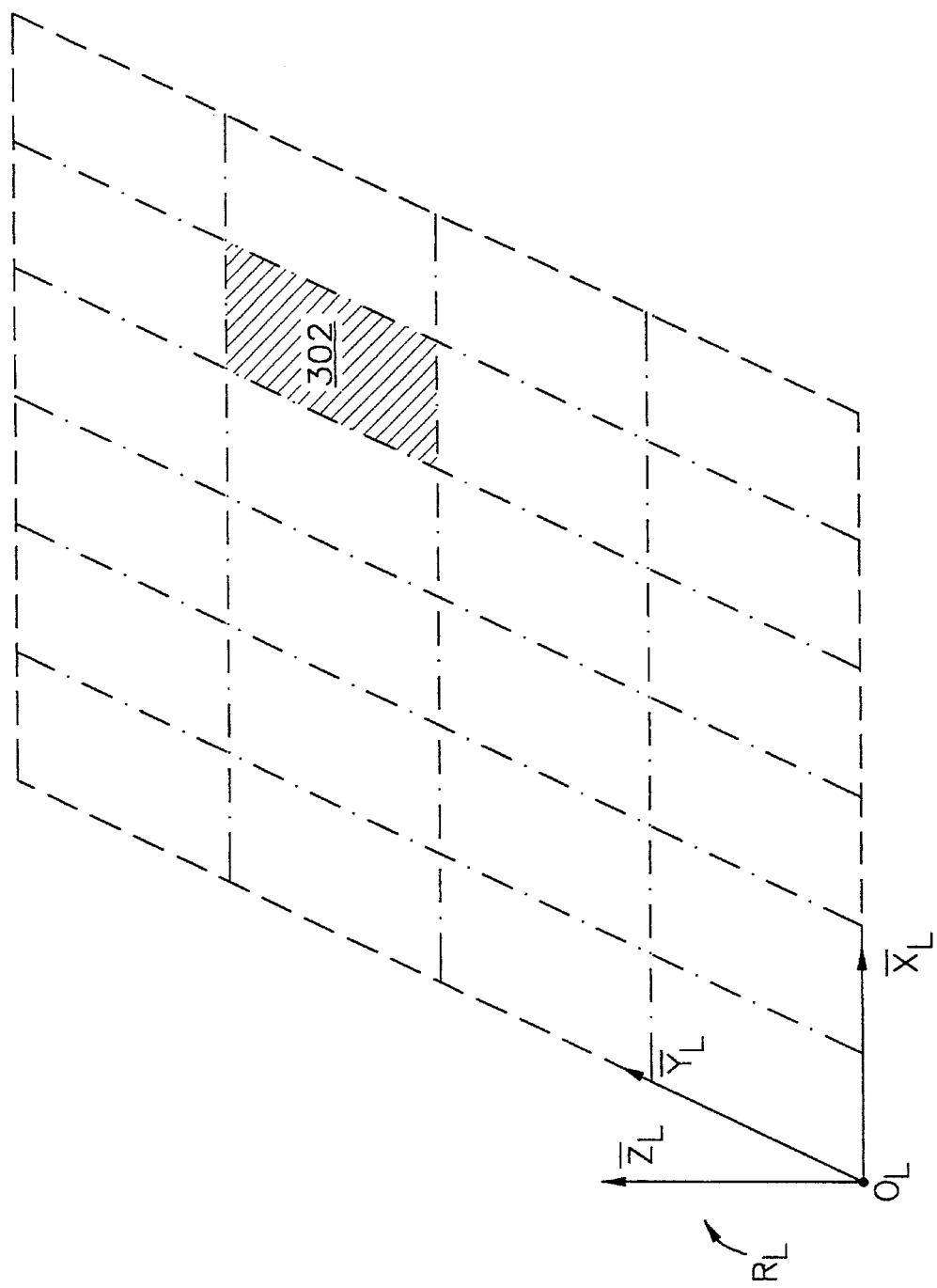
FIG. 3 is a diagrammatical representation of a fixed local reference station, a construction site and a local site within the construction site.

With reference to FIG. 3, in another embodiment, the construction site is defined with reference to a fixed local reference system ($R_L$) having an origin ($O_L$). Typically, the local reference system ($R_L$) is positioned at a primary location or base. The construction site may be viewed as being composed of a series of local sites 302 as shown in FIG. 3. The local site 302 is defined as the current work site. In this embodiment, the local reference system ($R_L$) is known as the terrestrial reference system ($R_T$).

For purposes of discussion, the term terrestrial reference system ($R_T$) is used as meaning either the Earth reference system or the fixed local reference system. The terrestrial reference system is defined by an origin ($O_T$), and three perpendicular axes, X,Y,Z.

Figure 4:
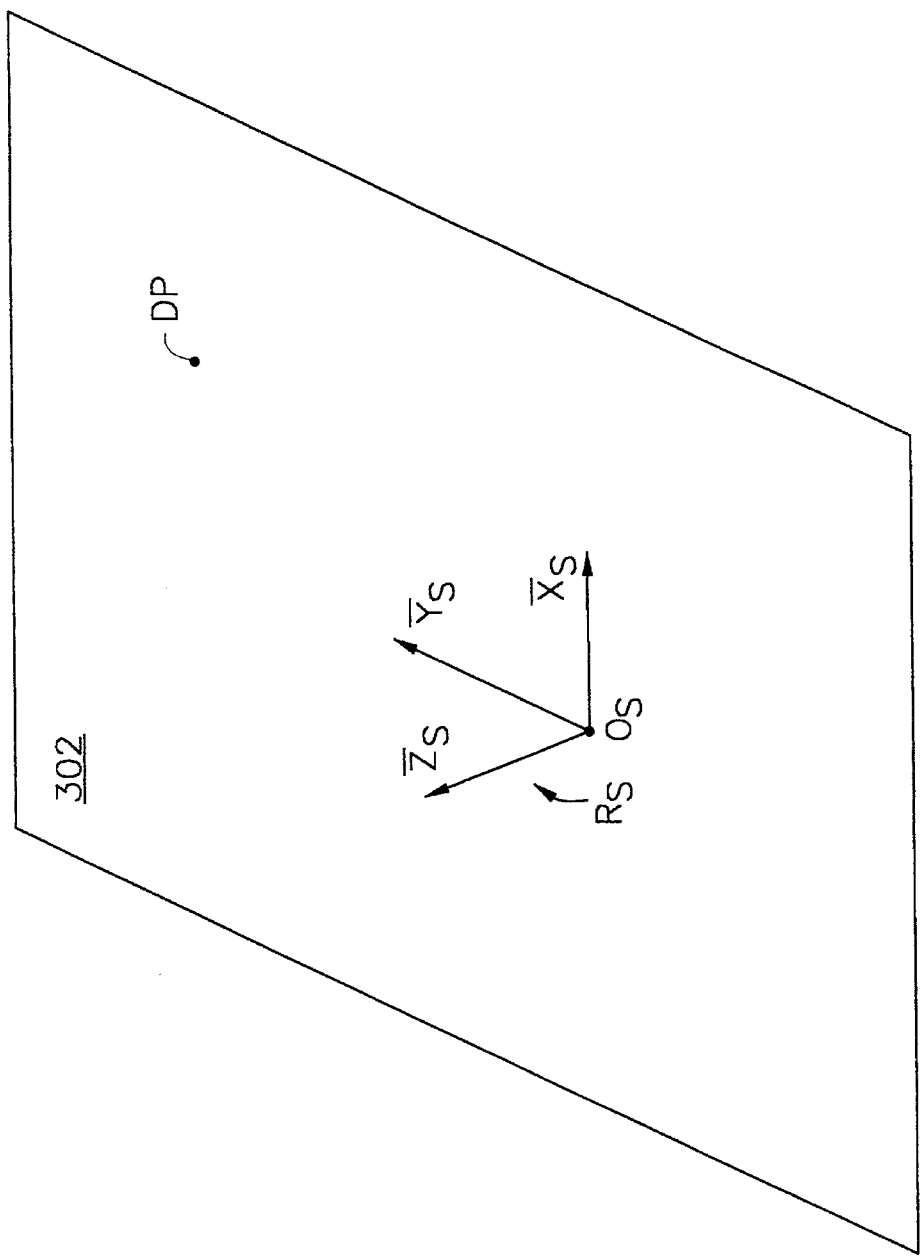
FIG. 4 is a diagrammatical representation of the local site of FIG. 3 and a reference station reference system.

With reference to FIG. 4, the local site or current work site 302 of FIG. 3 is shown enlarged. The reference station reference system $R_S$ is preferably within the work site 302. The present invention determines the location of the dynamic reference point (DP) relative to a reference station, i.e., within the reference station's reference system, $R_S$, determines the position of the reference station in the terrestrial reference system ($R_T$), and determines the terrestrial position of DP within the terrestrial reference system ($R_T$).

Figure 1:
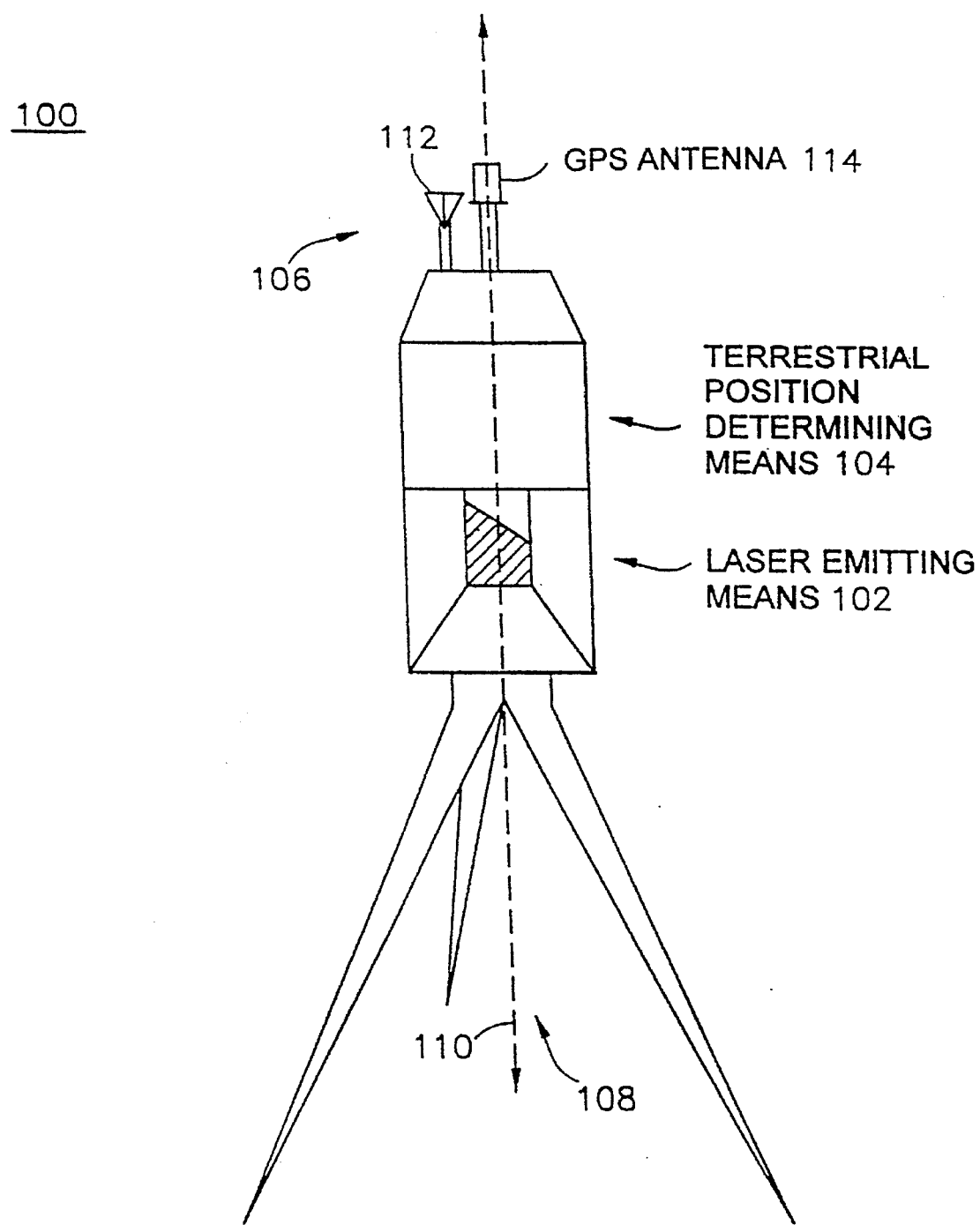
FIG. 1 is a diagrammatical view of a reference station with a terrestrial position determining means and a laser reference emitting means, according to an embodiment of the present invention.
Figure 7:
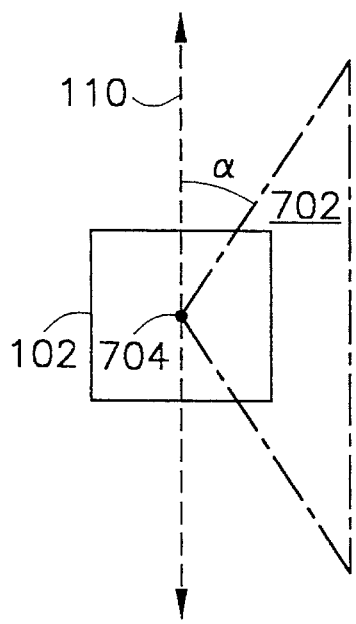
FIG. 7 is an illustration of the laser reference emitting means of FIG. 1 illustrating a divergent laser beam, according to an embodiment of the present invention.
Figure 8:
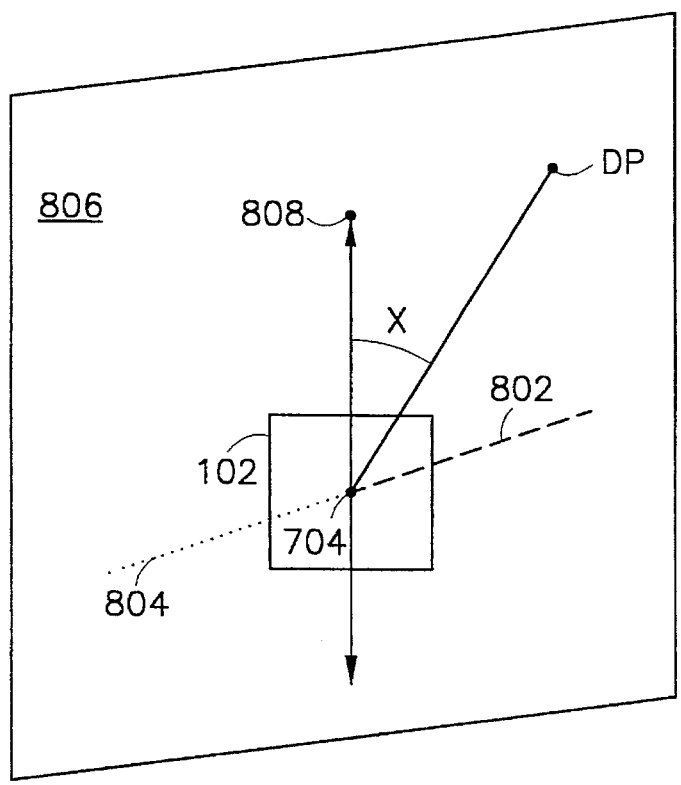
FIG. 8 is an illustration of a top view of the laser reference emitting means of FIG. 1 illustrating primary and secondary laser beams according to an embodiment of the present invention.

With reference to FIGS. 1 and 7, the reference station 100 includes a means 102 for emitting a primary laser reference beam 702. In the preferred embodiment, the laser beam originates at a point along an axis 110.

A means 104 determines a terrestrial position of a local reference point located on said laser reference emitting means 102 and responsively produces a terrestrial position signal. In the preferred embodiment, the local reference point coincides with the origin of the laser beam 704 emitted by the laser reference emitting means 102. A simple transformation allows for determining the terrestrial location of the origin of the laser beam.

A communication means 106 receives the terrestrial position signal and responsively transmits a communication signal indicative of the terrestrial position signal. In one embodiment, the terrestrial position signal comprises the terrestrial position of the origin of the laser beam. Preferably, the communication means 106 consists of a radio frequency transceiver and utilizes an RF antenna 112.

The laser reference producing means 102, terrestrial position determining means 104, and communicating means 106 are supported by and connected to a frame 108. Preferably, the frame 108 includes a tripod as shown.

Figure 5:
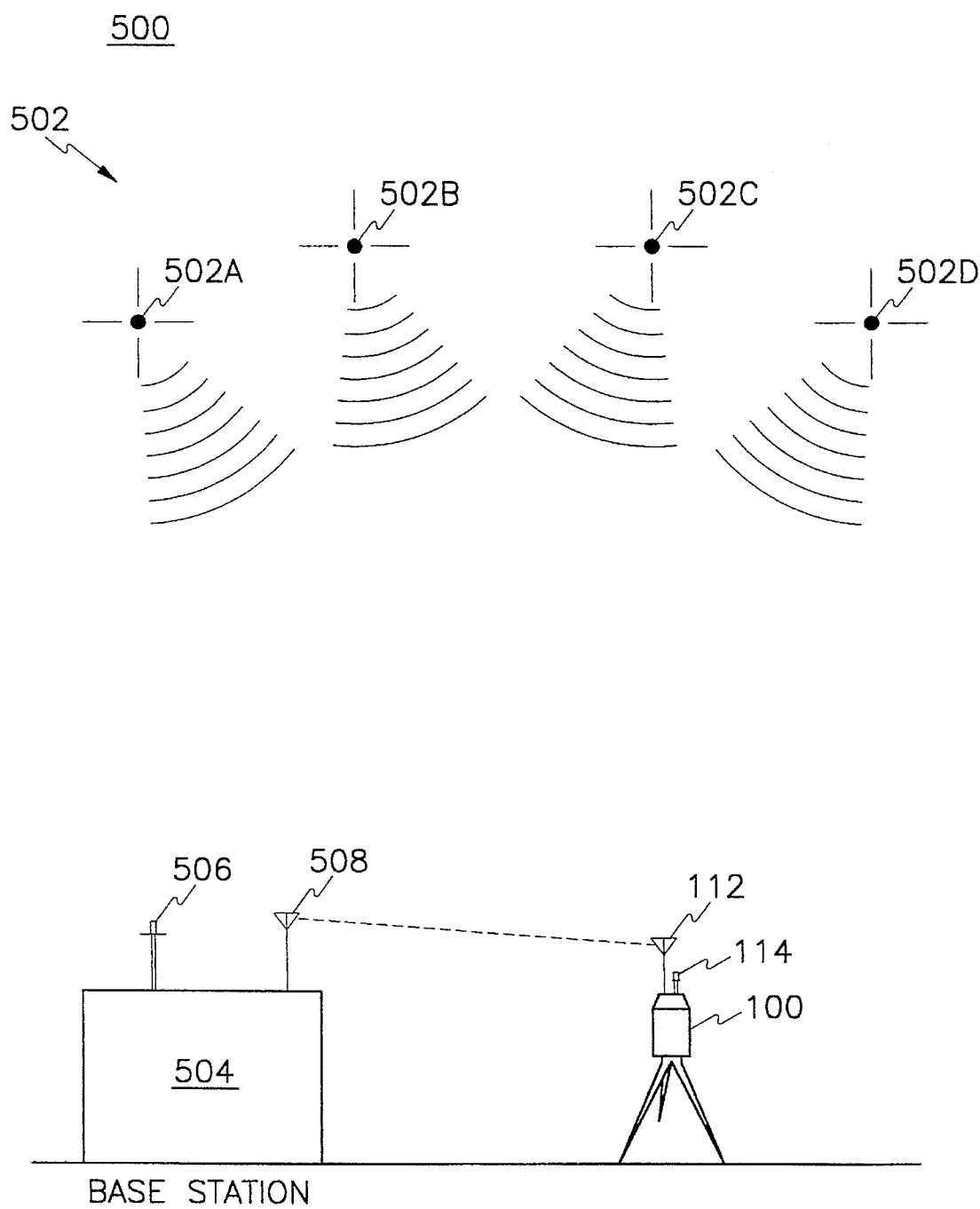
FIG. 5 is a diagrammatical view of the reference station of FIG. 1 at a site illustrating a constellation of GPS satellites and a base station.

The terrestrial position determining means 104 includes a GPS system 500, as shown in FIG. 5. The GPS system 500 utilizes signals from a constellation 502 of GPS satellites (502A,502B,502C,502D) received by a GPS antenna 114. In the preferred embodiment, the GPS antenna 114 is positioned along the axis 110 such that the determined position lies along the axis 110. The GPS system 500 determines the position of the GPS antenna 114. Since the antenna and the laser origin lie along the known axis 110, a simple transformation from the antenna position to the laser origin is accomplished. Preferably, the GPS system 500 is adapted to work with the U.S. government's NAVISTAR GPS satellite.

Preferably, the GPS system 500 includes a base station 504. The base station 504 also receives signals from the constellation of satellites 502. The base station 504 includes its own GPS system and is adapted to utilize the received signals to improve the terrestrial positions determined by the reference station 100. The base station 504 is adapted to communicate with the reference station via a RF antenna 508. The use of a base station 504 in improving position determinations is known in the art.

Figure 6:
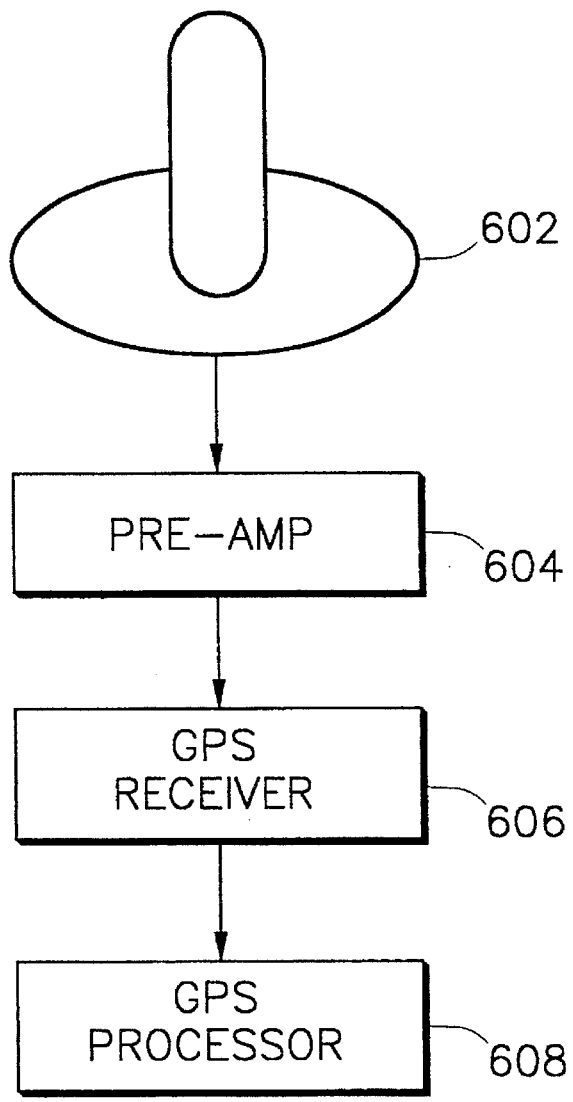
FIG. 6 is a block diagram of the terrestrial position determining means of FIG. 1, according to an embodiment of the present invention.

With reference to FIG. 6, each GPS system includes a GPS antenna 602, a pre-amp 604, a GPS receiver 606, and a GPS processor 608. One suitable GPS receiver is available from Magnavox, of Torrance CA as Model No. 723010. Preferably, the GPS system is a phase differential kinematic GPS system.

The laser emitting means 102 is adapted to rotate the primary laser beam in a plane about the axis 110. With reference to FIG. 7, in one embodiment the laser emitting means 102 is adapted to emit a divergent primary laser beam 702 originating at a laser origin point 704. The divergent laser beam 702 has an offset angle of $\alpha$ from the axis 110.

Typically, one or more reference stations are used to determine the location of DP. Preferably, the reference station reference system ($R_S$) has an origin at one of the reference stations.

The First Preferred Embodiment

With reference to FIG. 8–13, in the first preferred embodiment the laser emitting means 102 is adapted to emit a primary laser beam 802 and a secondary laser beam 804. In one embodiment, the primary and secondary laser beams are rotated in a horizontal plane 806. In another embodiment, the primary and secondary laser beams 802,804 are divergent and are rotated such that they are perpendicular to the plane 806.

Preferably the primary and secondary laser beams 802, 804 are rotated in opposite directions about the axis 110 at an equal and constant speed. In one embodiment, the laser emitting means 102 is adapted to emit primary and secondary laser beams 802,804 which rotate 360° about the axis 110.

In another embodiment, the primary and secondary laser beams 802,804 rotate less then 360°, e.g., 180°. Preferably, to accomplish this the laser emitting means 102 includes a mirror. The mirror is placed behind the laser emitter which rotates 360°. The secondary laser beam 804 is generated when the primary laser beam 802 strikes and reflects off of the mirror. A flat mirror produces laser beams which rotate 180°. A curved mirror will produce laser beams which rotate at less than or more than 180°.

Preferably, the reference station 100 is positioned such that a predetermined axis defined by a predetermined datum point 808 and an origin point, points in a predetermined direction, e.g., North. The datum point 808 and the origin point 110 lie in the plane of rotation 806.

The communication means 106 is adapted to transmit the terrestrial position of the local reference point 704. The local reference point may be located at the laser origin or at another location along the axis 110, e.g., a location directly beneath the reference station 100. The transmission of the terrestrial position may occur periodically, e.g., every hour, or may be encoded with the datum signals.

Preferably, the communicating means 106 comprises a radio frequency transmitter.

Figure 10:
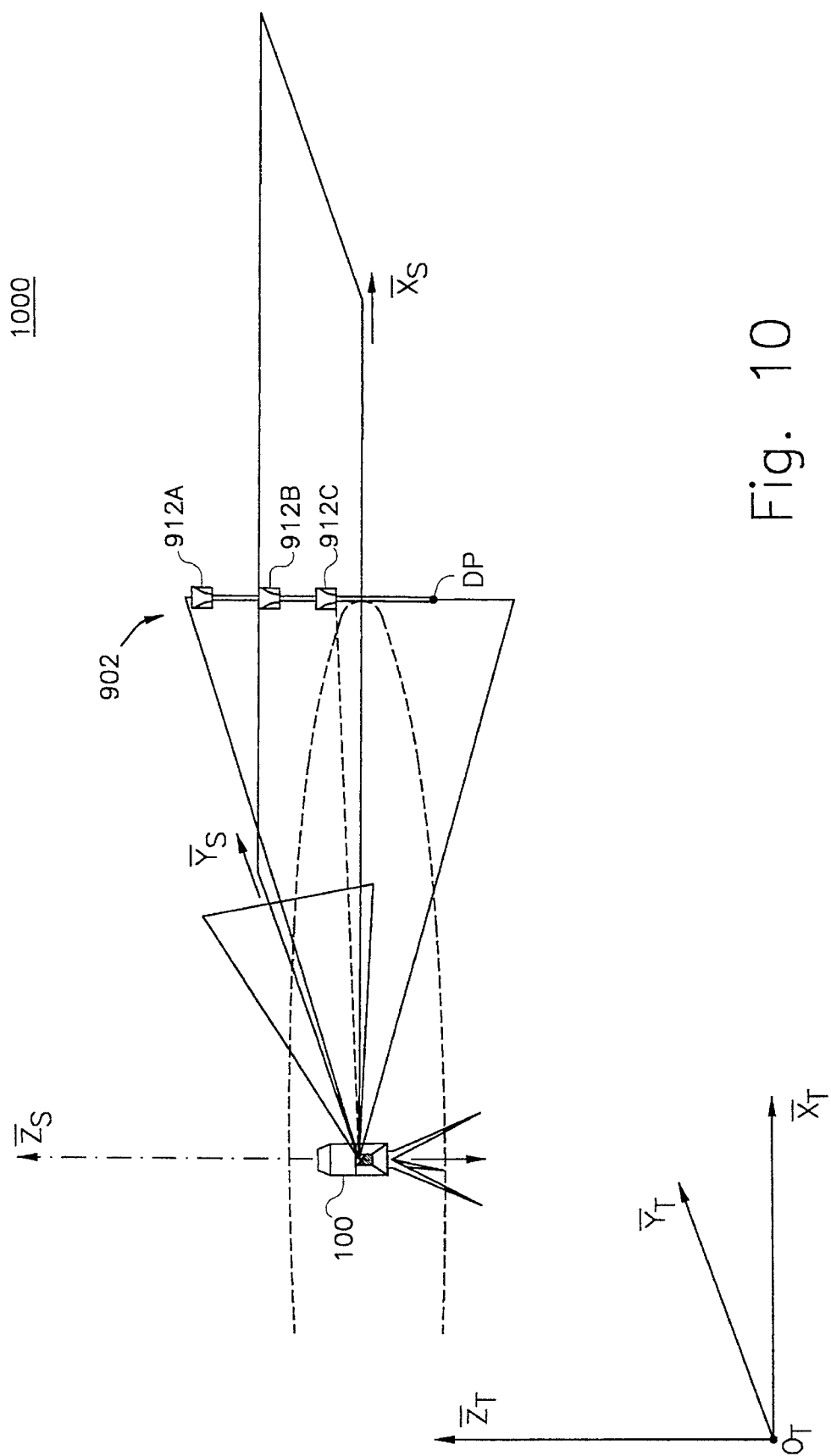
FIG. 10 is an illustration of a site with one reference station and a positioning means.
Figure 11:
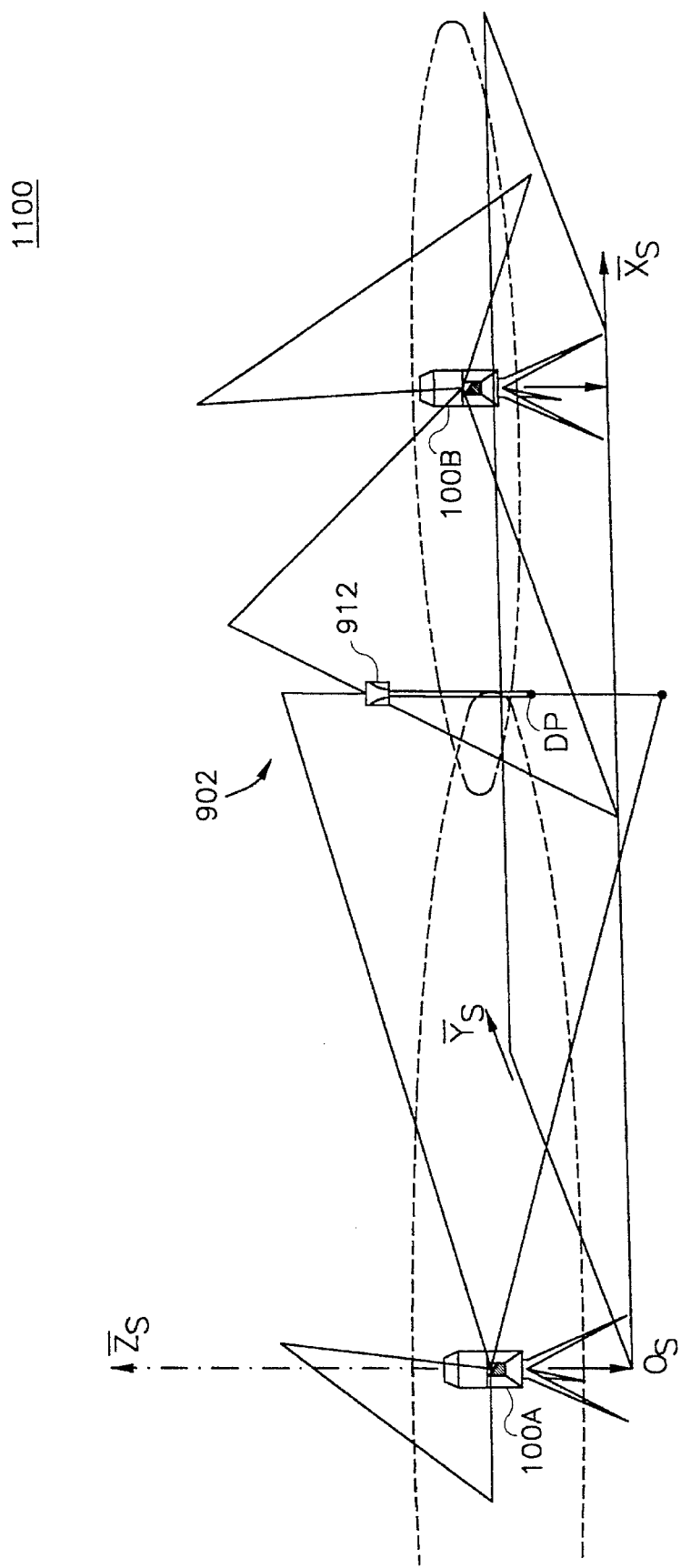
FIG. 11 is an illustration of a site with two reference stations and a positioning means.
Figure 12:
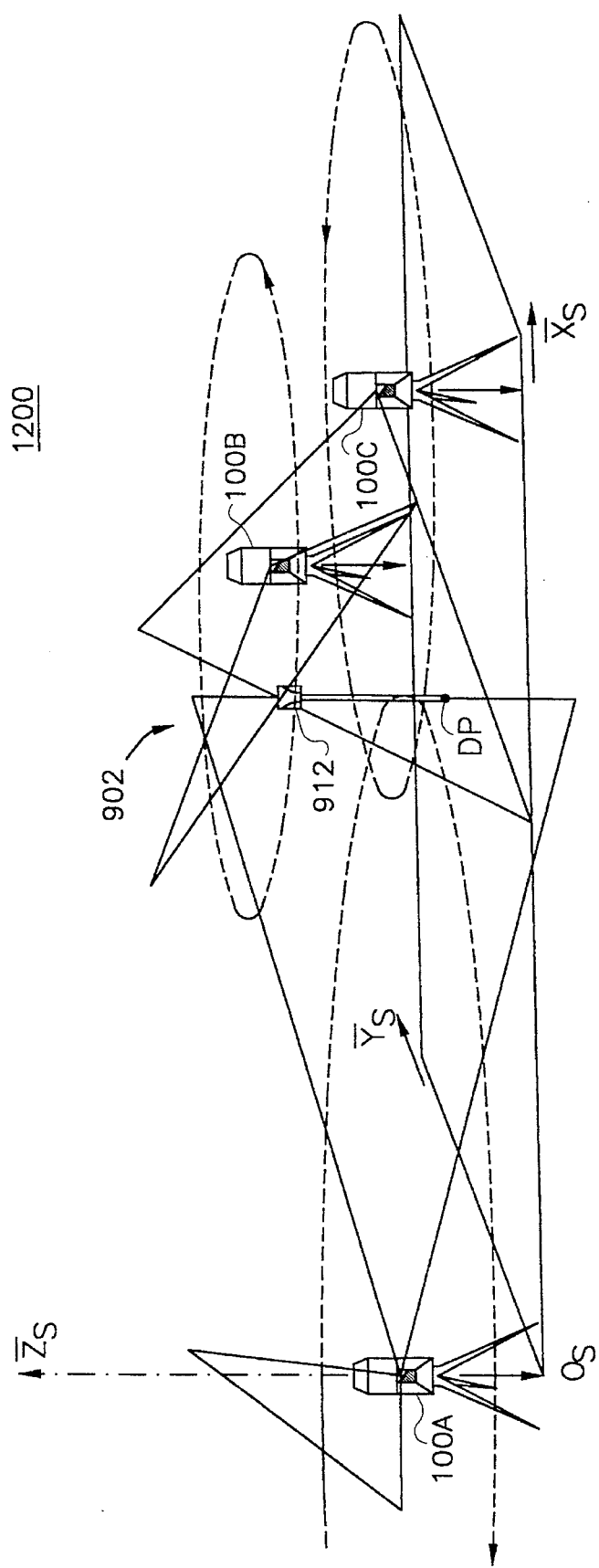
FIG. 12 is an illustration of a site with three reference stations and a position means.

With reference to FIGS. 10, 11, and 12 and in accordance with the first preferred embodiment, the present invention encompasses a spatial positioning and measurement system 1000,1100,1200 for determining the instantaneous terrestrial position of a dynamic reference point DP. The system 1000,1100,1200 includes at least one reference station 100.

Figure 9:
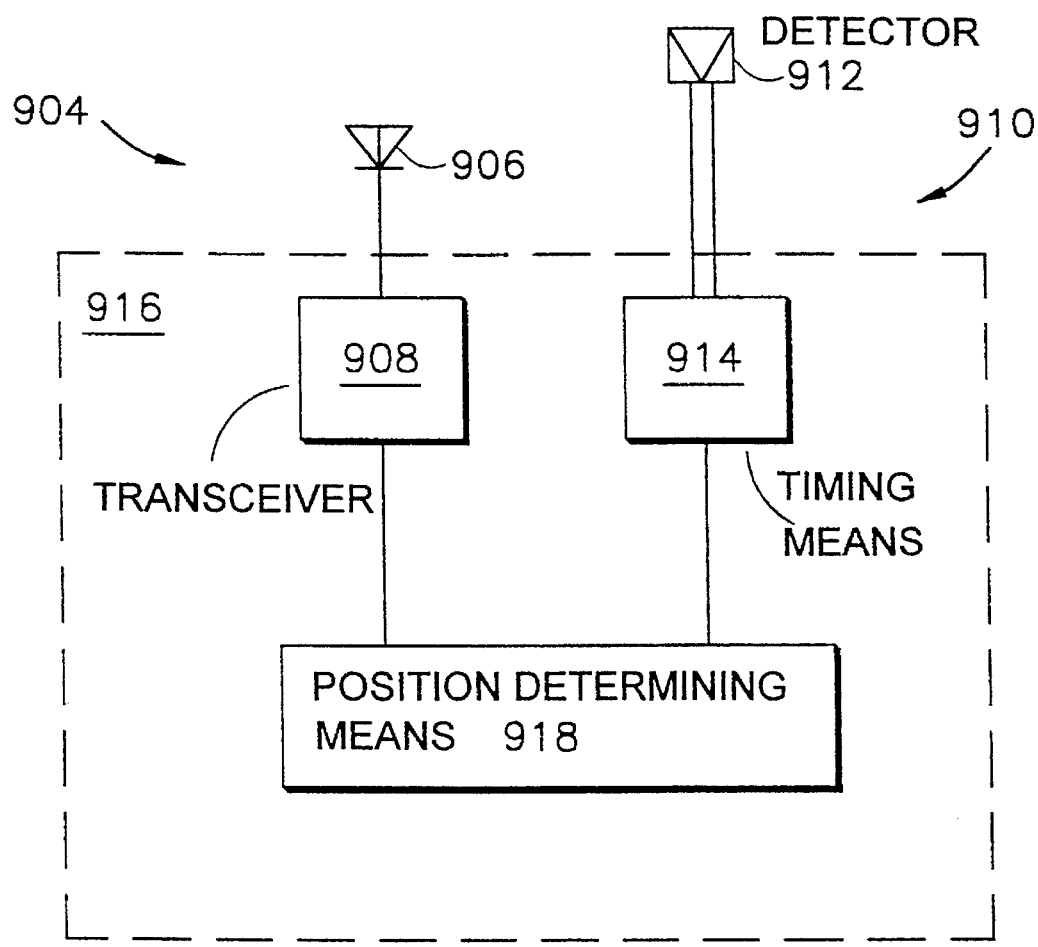
FIG. 9 is a block diagram of a positioning means, according to an embodiment of the present invention.
Figure 16:
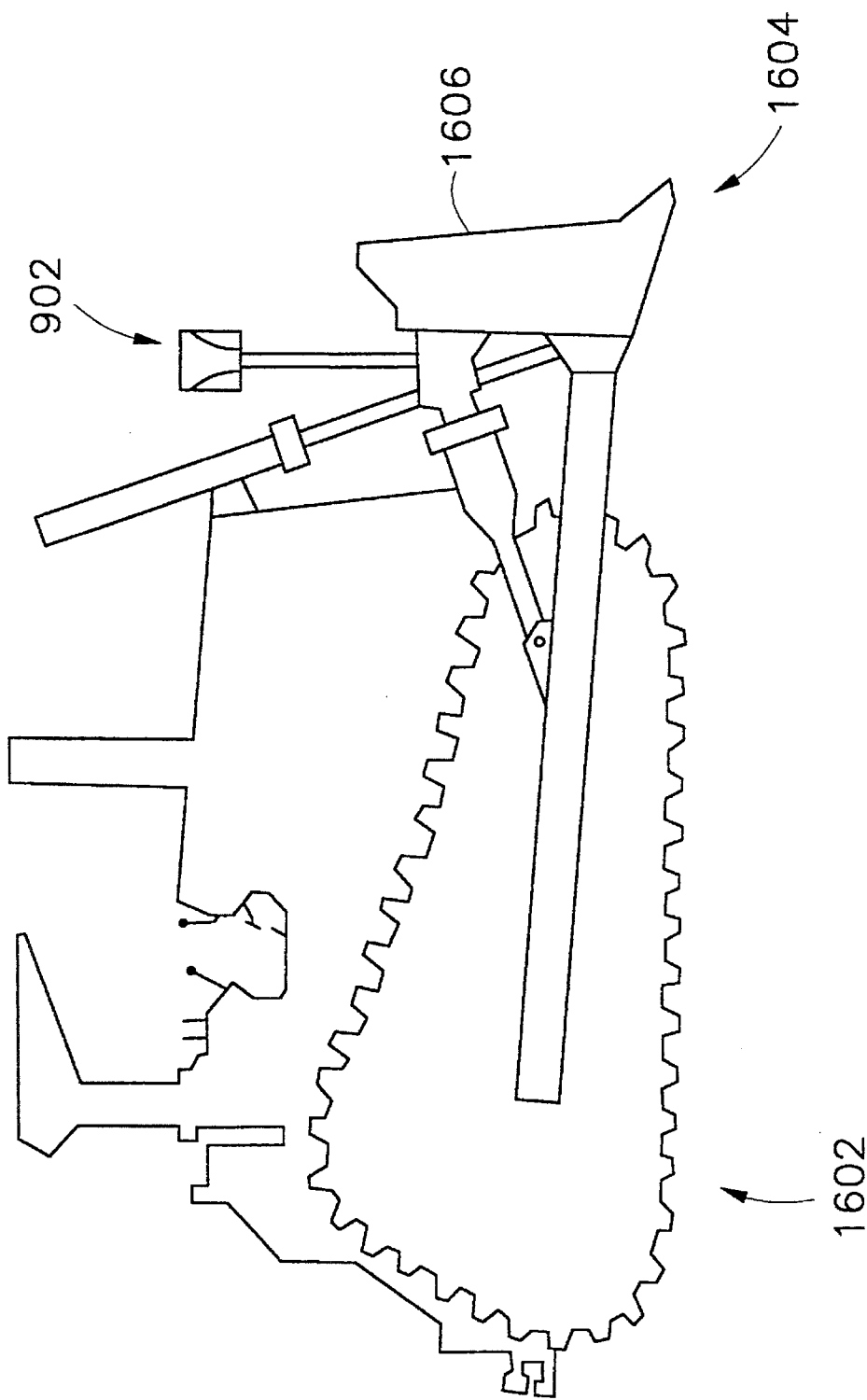
FIG. 16 is a view of an earthmoving machine utilizing a positioning means.

With reference to FIG. 9, a positioning means 902 is located at the dynamic reference point DP. In FIGS. 10–12, the positioning means 902 is shown as consisting of a rod. The positioning means 902 can, thus, be hand carried from location to location. However with reference to FIG. 16, the positioning means 902 may be fixed to a earthmoving machine 1602. The earthmoving machine 1602 includes a work implement 1604. The earthmoving machine 1602 of FIG. 16 is a track type tractor (TTT) and the work implement 1604 consists of a dozer blade. The positioning means is connected to the work implement, as shown.

A means 910 detects the primary and secondary laser beams 802,804, responsively determines the location of the dynamic reference point DP relative to the reference station 100, and responsively produces a location signal. The detection means 910 includes at least one detector 912 and a timing means 914. The detecting means 910 detects the primary and secondary laser beams. The timing means 914 generates signals indicative of the time at which the primary and secondary laser beams were detected.

A second communication means 904 provides a communication link between the producing means 902 and the references stations 100. The second communication means 904 preferably includes an RF antenna 906 and a receiving means (transceiver) 908.

The producing means 902 includes a controlling means 916 which is preferably microprocessor based. The controlling means 916 includes a position determining means 918. The position determining means 918 receives the timing signals, determines the location of the dynamic reference point 704 relative to the reference station 100. From the receiving means 906, the position determining means 918 receives the terrestrial position of the reference station 100 and determines the terrestrial position of the dynamic reference point as a function of the terrestrial position of the reference station 100 and the location of the dynamic reference point 704 relative to the reference station 100.

A means 904 receives the communication signal and the location signal and responsively determines the terrestrial position of the dynamic reference point DP.

Preferably, the location determining means 912 determines the reference angle between the axis formed by the local reference point 704 and the datum point 808 and the line segment between the local reference point 704 and the dynamic reference point. For example, assuming the primary and secondary lasers beams rotate 180° and rotation begins along the line on which reference point 808 lies, the reference angle X is determined by:

$$X = \left( \frac{t_1 - t_2}{2} + \mu \right) \times \frac{\omega}{2 \times \pi}$$

where, $t_m$ is the time of crossing of the primary laser beam, $t_2$ is the time of crossing of the secondary laser beam, $\omega$ is the rotational speed of the laser, and $\mu$ is an offset dependent upon the geometry of the laser emitter.

Utilizing the known terrestrial position(s) of the reference station(s) 100 and the reference angles, the location of the dynamic reference point, DP, relative to the reference station is determined by known triangulation techniques. The determined location is defined in terms of the reference station reference system, $R_S$.

Once the location of the dynamic reference point DP is known relative to the reference station 100, the terrestrial position of the dynamic reference point may be determined by adding the relative location of the dynamic reference point to the terrestrial position of the reference station 100.

With reference to FIG. 10, a system 1000 for determining the 3-dimensional terrestrial position of a dynamic reference point 702 utilizing a single reference station 100 and a position determined means 902 with a plurality of detectors, e.g., three 912A, 912B,912C is shown. The three detectors 912A,912B,912C provide the position determining means 902 with information in order to determine the height or z coordinate of the dynamic reference.

With reference to FIG. 11, a system 1100 for determining the 3-dimensional terrestrial position of a dynamic reference point DP utilizing two reference stations 100A, 100B and a position determining means 902 is shown. Preferably, the second reference station 100B is adapted to emit primary and secondary laser beams.

With reference to FIG. 12, a system 1200 for determining the 3-dimensional terrestrial position of a dynamic reference point (DP) utilizing three reference stations 100A,100B, 100C is shown.

Laser systems and methods of operating such systems to determine 3-dimensional locations relative to the reference stations are disclosed in U.S. Pat. No. 5,110,202, issued on May 5, 1992 to Andrew W. Dornbusch et al, which is herein incorporated by reference.

The Second Preferred Embodiment

In the second preferred embodiment, the reference station 100 is adapted to produce a first primary divergent laser beam.

In one embodiment, the communicating means 106 of the reference station is adapted to transmit a datum signal each time the laser passes a predetermined point. This allows the reference station to be placed at a new location without requiring a predetermined orientation, i.e., without requiring the reference station to be "facing" a known direction.

In another embodiment, at least two reference stations 100 are used. Each reference station 100 includes a detector to sense the laser beams emitted by the other stations and is adapted to transmit a datum signal in response to sensing laser beams.

Figure 13:
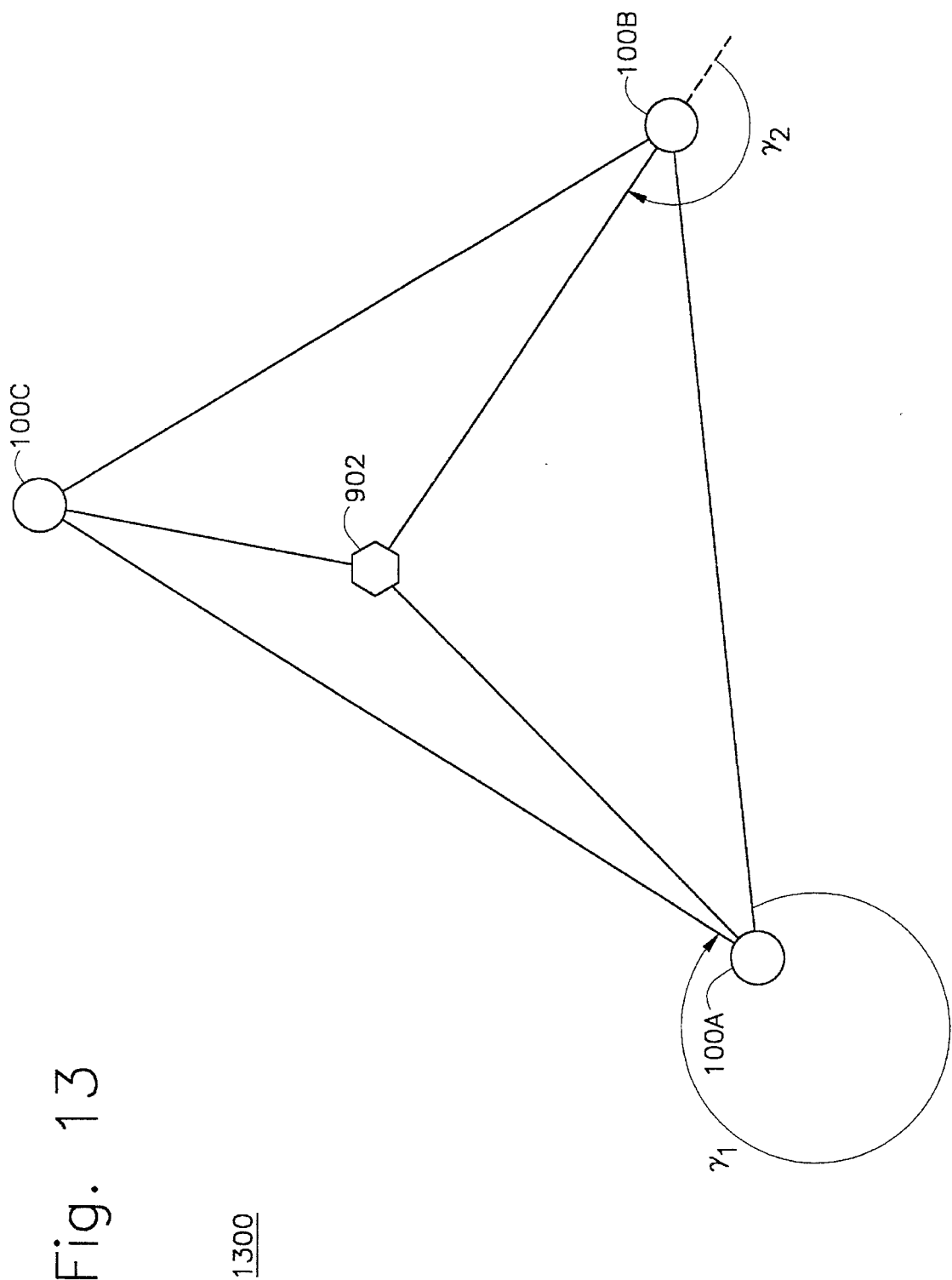
FIG. 13 is a top view of a work site having three reference stations and a positioning means according to an embodiment of the present invention.
Figure 14:
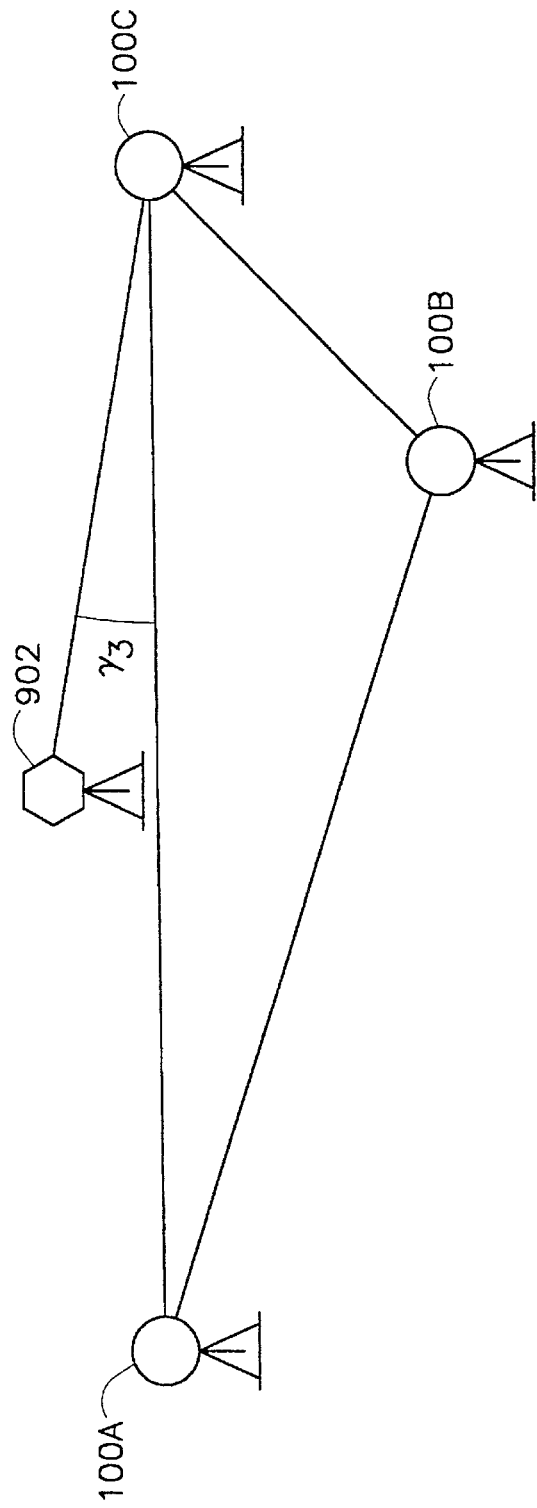
FIG. 14 is a side view of the work site of FIG. 13.

For example with regard to FIG. 13 and 14, a system 1300 for determining the terrestrial position of a dynamic reference point (DP) includes three reference stations 100A, 100B,100C. The positioning means 902 is located at the dynamic reference point (DP). The second communicating means 904 receives the datum signals. The detecting means 910 detects the laser beams.

The timing means 914 determines and stores the times at which the datum signals are detected.

Based on ratios determined from the timing signals, angles $(\gamma_1,\gamma_2,\gamma_3)$ between the datum lines of the three reference stations and the position means 902 are determined. Two of the reference stations 100A, 100B are used to determine the angles $(\gamma_1,\gamma_2)$ between the positioning means 902 and the first and second reference stations 100A,100B, respectively. The angles $\gamma_1$ and $\gamma_2$ are used to geometrically determine the two dimensional coordinates of DP, i.e., the X-Y coordinates. The third reference station 100C is utilized to determine a horizontal angle and hence the Z coordinate. An in-depth discussion of methods and variations of the apparatus used to determine the location of DP relative to the reference stations are discussed in U.S. Pat. No. 5,100,229 issued to Eric Lundberg et al on Mar. 31 1992, which is herein incorporated by reference.

Utilizing the known terrestrial position of the reference station 100 and the reference angles, the location of the dynamic reference point, DP, relative to the reference station is determined by known triangulation techniques. The determined location is defined in terms of the reference station reference system, $R_S$.

Once the location of the dynamic reference point DP is known relative to the reference station 100 the terrestrial position of the dynamic reference point may be determined by adding the relative location of the dynamic reference point to the terrestrial position of the reference station 100.

The Third Preferred Embodiment

Figure 15:
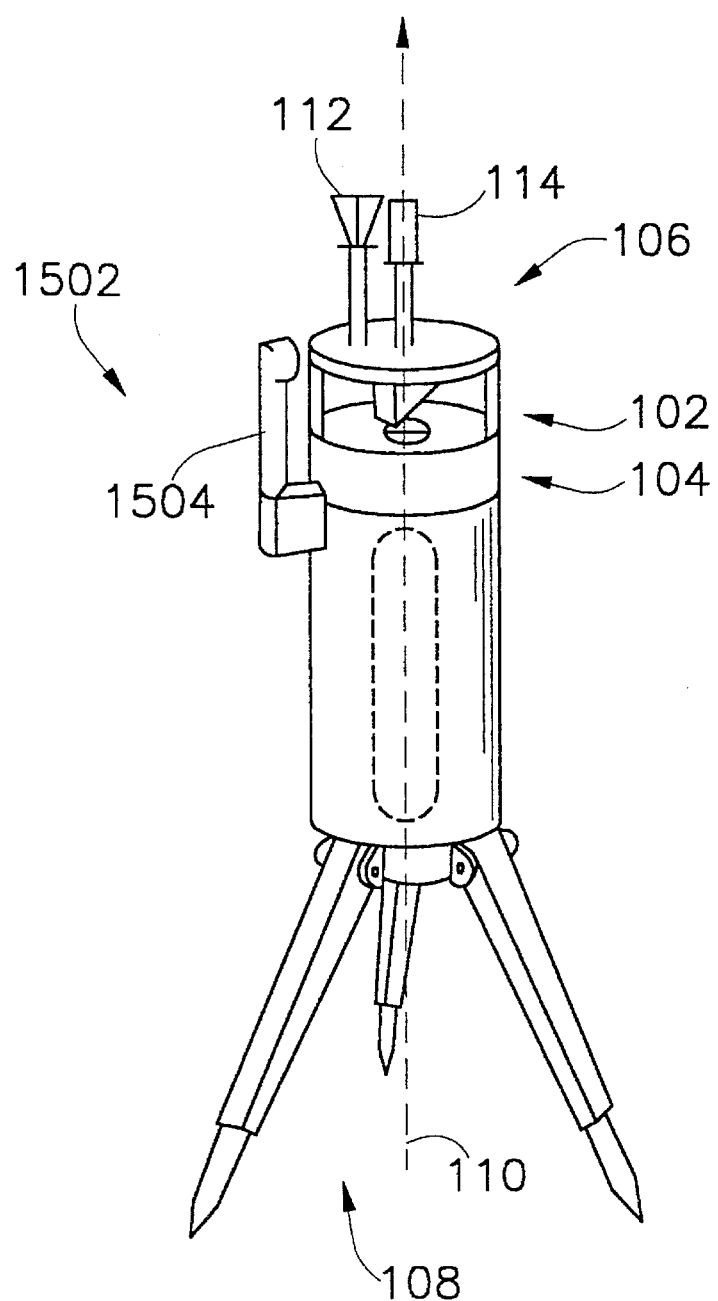
FIG. 15 is a diagrammatical view of a reference station according to another embodiment of the present invention.

With reference to FIG. 15, in a third preferred embodiment the reference station 100 includes a detecting means 1502. For simplicity, components of the reference station 100 of FIG. 15 are numbered the same as in the previous figures and discussion.

The means 102 for emitting a primary laser reference beam.

The means 104 determines the terrestrial position of the local reference point located on the laser reference emitting means 102.

The communication means 106 receives the terrestrial position signal and responsively transmits a communication signal indicative of the terrestrial position signal.

The laser reference producing means 102, terrestrial position determining means 104, and communicating means 106 are supported by and connected to a frame 108. Preferably, the frame 108 includes a tripod as shown.

The detecting means 1502 includes a detector 1504 for detecting a laser beam. The detector produces an electrical signal when struck by a laser beam.

The communication means 106 is adapted to receive the electrical signal from the detecting means and responsively transmit a signal.

On a work site, the second communication means 904 is adapted to receive the transmitted signals. The timing means 914 stores the time at which the transmitted signals were received and the time at which the laser beams were detected.

For a further discussion with regard to a system for determining location relative to a reference station in accordance with the third preferred embodiment, see U.S. Pat. No. 4,820,041 issued Apr. 11, 1989 to Richard W. Davidson et al, which is herein incorporated by reference.

Utilizing the known terrestrial position of the reference station 100 and the reference angles, the location of the dynamic reference point, DP, relative to the reference station is determined by known triangulation techniques. The determined location is defined in terms of the reference station reference system, $R_S$.

Once the location of the dynamic reference point DP is known relative to the reference station 100 the terrestrial position of the dynamic reference point may be determined by adding the relative location of the dynamic reference point to the terrestrial position of the reference station 100.

In the first, second and third preferred embodiment, as discussed above, angles are generally determined as a function of ratios of the times of various events.

In alternate embodiment, a data signal is added to the laser beam. The data signal is modulated a function of the angular position of the laser beam relative to some reference. The amplitude or frequency of the data signal may be modulated. For example, the amplitude of the data signal may linearly increase from an initial value, $A_{initial}$ to a maximum value, $A_{maximum}$. The detectors 912 on the positioning means 902 are adapted to detect the magnitude. The positioning means 902 is adapted to determine the angles as a function of the detected magnitudes.

Likewise in another example, the frequency of the data signal may be linearly modulated from an initial frequency, $f_{initial}$, to a maximum frequency, $f_{maximum}$.

Industrial Applicability

With reference to the drawings and in operation, the present invention is adapted to determine the instantaneous position of a dynamic reference point. The present invention includes a fixed reference station 100 adapted to determine its terrestrial position, to emit a laser beam, and to transmit its terrestrial position.

Preferably, the reference station 100 utilizes a GPS system 600. The GPS system 600 includes a GPS receiver and a base station 504. Such a GPS system 600 allows real-time position determinations. Since the position of the reference station is fixed, the accuracy of the GPS position determinations is increased.

The present invention also embodies a system 1002,1102, 1202 composed of at least one reference station 100 and a positioning means 902 for receiving communication signals and detecting laser beams. Preferably, the position means 902 is located on an earthmoving machine 1602 as shown in FIG. 16. The system 1002,1102,1202 allows for real-time determinations of the position of the machine. In addition, the position means 902 may be located or attached to a work implement 1606. Thus, the position of the work machine's work tool 1604 can be determined.

Other aspects, objects, and features of the present invention can be obtained from a study of the drawings, the disclosure, and the appended claims.

I claim:

1. A reference station, comprising:

a station frame;

means connected to said frame for emitting a primary laser reference beam;

means for determining a terrestrial position of a reference point located on the reference station relative to a fixed terrestrial reference system, $R_T$, and responsively producing a terrestrial position signal; and communication means for receiving said terrestrial position signal and responsively transmitting a communication signal indicative of said terrestrial position signal.

2. A reference station, as set forth in claim 1, wherein said laser emitting means is adapted to rotate said primary laser beam in a plane about said axis.

3. A reference station, as set forth in claim 2, wherein said communication means is adapted to transmit a datum signal when said primary laser beam passes a predetermined datum point in said plane.

4. A reference station, as set forth in claim 1, wherein said terrestrial positioning means includes a Global Positioning Satellite system.

5. A reference station, as set forth in claim 1, wherein said terrestrial positioning means includes a GPS antenna and GPS receiver.

6. A reference station, as set forth in claim 1, wherein said communication means receives position information from a base station and wherein said terrestrial position determining means is adapted to receive signals from a constellation of GPS satellites and responsively determine said terrestrial position as a function of said signals from said constellation and said position information from base station.

7. A reference station, as set forth in claim 1, wherein said laser reference emitting means includes:

means for emitting a secondary laser beam adapted to rotate in one direction about said axis;

wherein said laser reference emitting means is adapted to rotate said primary laser beam in another direction about said axis; and wherein said primary and secondary laser beams rotate about said axis at constant velocities having equal magnitudes and opposite directions.

8. A reference station, as set forth in claim 7, wherein said primary and secondary laser beams are divergent.

9. A reference station, as set forth in claim 7, wherein said primary and secondary laser beams rotate 360° about said axis and are out of phase by 180°.

10. A reference station, as set forth in claim 7, wherein said primary and secondary laser beams rotate less than 360° about said axis.

11. A reference station, as set forth in claim 7, wherein said primary and secondary laser beams rotate more than 360° about said axis.

12. A reference station, as set forth in claim 1, wherein said communicating means includes a radio frequency transceiver.

13. A reference station, as set forth in claim 1, includes means for detecting laser beams.

14. A reference station, as set forth in claim 13, wherein said communications means is adapted to transmit a signal in response to detection of a laser beam by said detection means.

15. A spatial positioning and measurement system for determining the instantaneous position of a reference point, DP, comprising:

at least one reference station, said one reference station including:

a station frame;

means connected to said frame for emitting a primary laser reference beam;

means for determining a terrestrial position of a reference point located on said laser reference emitting means and responsively producing a terrestrial position signal; and communication means for receiving said signal and responsively emitting a communication signal indicative of said terrestrial position;

wherein the spatial positioning and measurement system further comprises a positioning means located at said reference point, said positioning means including:

means for detecting said primary laser reference beam, responsively determining the location of said reference point, DP, relative to said reference station, and responsively producing a location signal;

means for receiving said communication signal and said location signal and responsively determining the terrestrial position of the reference point, DP.

16. A system, as set forth in claim 15, wherein said laser emitting means of said at least one reference station being adapted to rotate said primary laser beam in a plane about an axis.

17. A system, as set forth in claim 16, wherein said communication means of said at least one reference station being adapted to transmit a datum signal when said laser beam passes a predetermined angle in said plane.

18. A system, as set forth in claim 15, including only one reference station.

19. A system, as set forth in claim 18, wherein said detecting means includes three detectors.

20. A system, as set forth in claim 15, wherein said positioning means includes two reference stations.

21. A system, as set forth in claim 15, wherein said positioning means includes three reference stations.

22. A system, as set forth in claim 21, wherein said laser reference emitting means includes:

means for emitting a secondary laser beam adapted to rotate in one direction about said axis;

wherein said laser reference emitting means being adapted to rotate said primary laser beam in another direction about said axis; and wherein said primary and secondary laser beams rotate about said axis at constant velocities having equal magnitudes.

23. A system, as set forth in claim 22, wherein said primary and secondary laser beams are divergent.

24. A system, as set forth in claim 22, wherein said primary and secondary laser beams rotate 360° about said axis and are out of phase by 180°.

25. A system, as set forth in claim 22, wherein said primary and secondary laser beams rotate less than 360° about said axis.

26. A system, as set forth in claim 22, wherein said primary and secondary laser beams rotate more than 360° about said axis.

27. A system, as set forth in claim 21, wherein said communicating means includes a radio frequency transceiver.

28. A system as set forth in claim 22, wherein said positioning means includes means for detecting each of said primary and secondary laser beams from said reference stations and storing the time at which each was received.

* * * * *